(12) United States Patent
Keeler

(10) Patent No.: US 10,573,030 B2
(45) Date of Patent: Feb. 25, 2020

(54) METHOD FOR ARTIFACT REDUCTION USING MONOENERGETIC DATA IN COMPUTED TOMOGRAPHY

(71) Applicant: Photo Diagnostic Systems, Inc., Boxboro, MA (US)

(72) Inventor: Matthew Len Keeler, Bolton, MA (US)

(73) Assignee: Photo Diagnostic Systems, Inc., Boxboro, MA (US)

(*) Notice: Subject to any disclaimer, the term of this patent is extended or adjusted under 35 U.S.C. 154(b) by 189 days.

(21) Appl. No.: 15/482,289

(22) Filed: Apr. 7, 2017

(65) Prior Publication Data
US 2018/0293763 A1 Oct. 11, 2018

(51) Int. Cl.
*G06T 11/00* (2006.01)

(52) U.S. Cl.
CPC .. *G06T 11/008* (2013.01); *G06T 2207/10081* (2013.01); *G06T 2211/432* (2013.01)

(58) Field of Classification Search
CPC .. G06T 11/00; G06T 11/008; G06T 2211/432; G06T 2211/408; G06T 2207/10081; G06T 2207/10124; G06T 2207/10116; G01N 23/00; G01N 23/04; G01N 23/046
USPC .......................... 378/4, 5, 901; 382/131, 132
See application file for complete search history.

(56) References Cited

U.S. PATENT DOCUMENTS

| 5,115,394 A | 5/1992 | Walters |
| 5,155,365 A | 10/1992 | Cann et al. |
| 6,028,907 A | 2/2000 | Adler et al. |
| 6,122,344 A | 9/2000 | Beevor |
| 6,904,118 B2 | 6/2005 | Wu et al. |
| 6,950,492 B2 | 9/2005 | Besson |
| 6,950,493 B2 | 9/2005 | Beonon |
| 6,973,158 B2 | 12/2005 | Besson |
| 6,987,833 B2 | 1/2006 | Du et al. |
| 6,997,610 B2 | 2/2006 | Heismann |

(Continued)

FOREIGN PATENT DOCUMENTS

DE    10 2011 005 161    10/2016

OTHER PUBLICATIONS

Glover, G. et al., "An algorithm for the reduction of metal clip artifacts in CT reconstructions", Med. Phys., vol. 8, No. 6, 1981, pp. 799-807.

(Continued)

*Primary Examiner* — Jurie Yun
(74) *Attorney, Agent, or Firm* — Pandiscio & Pandiscio

(57) ABSTRACT

A method for artifact correction in computed tomography, the method including: (1) acquiring a plurality of data sets associated with at least one low X-ray energy, and at least one high X-ray energy; (2) generating a plurality of preliminary images from the plurality of data sets; (3) identifying sources of an artifact source image; (4) forward projecting the artifact source image to produce artifact source data; (5) selecting and combining the plurality of data sets acquired in order to produce a new subset of data associated with the artifact, whereby to produce artifact reduced data; (6) generating a repaired data set to keep data sets associated with the low X-ray energy in artifact-free data and to introduce data sets associated with the high X-ray energy in regions impacted by an artifact; and (7) generating a final reduced artifact image from the repaired data set.

6 Claims, 7 Drawing Sheets

3) Artifact Source Image
$(ASI) = f(I_1, I_2, I_3 ... I_n)$

4) Artifact Source Data
$(ASD) = fp(ASI)$

(56) References Cited

U.S. PATENT DOCUMENTS

| | | |
|---|---|---|
| 7,027,561 B2 | 4/2006 | Francke et al. |
| 7,158,611 B2 | 1/2007 | Heismann et al. |
| 7,175,347 B2 | 2/2007 | Tybinkowski et al. |
| 7,190,757 B2 | 3/2007 | Ying et al. |
| 7,215,732 B2 | 5/2007 | Yin et al. |
| 7,217,927 B2 | 5/2007 | Worstell |
| 7,272,429 B2 | 9/2007 | Walker et al. |
| 7,298,812 B2 | 11/2007 | Tkaczyk et al. |
| 7,315,604 B2 | 1/2008 | Raupach |
| 7,396,160 B2 | 7/2008 | Tybinkowski et al. |
| 7,397,895 B2 | 7/2008 | Bailey et al. |
| 7,420,675 B2 | 9/2008 | Glakos |
| 7,438,471 B2 | 10/2008 | Tybinkowski et al. |
| 7,453,974 B2 | 11/2008 | Van Steven-daal et al. |
| 7,551,708 B2 | 6/2009 | Basu et al. |
| 7,568,836 B2 | 8/2009 | Bailey et al. |
| 7,583,779 B2 | 9/2009 | Tkaczyk et al. |
| 7,627,080 B2 | 12/2009 | Proksa |
| 7,688,936 B2 | 3/2010 | Toth |
| 7,697,657 B2 | 4/2010 | Walter et al. |
| 7,724,865 B2 | 5/2010 | Wu et al. |
| 7,742,564 B2 | 6/2010 | Parham et al. |
| 7,773,725 B2 | 8/2010 | Gordon, III et al. |
| 7,778,380 B2 | 8/2010 | Altman et al. |
| 7,778,454 B2 | 8/2010 | Grasruck et al. |
| 7,826,587 B1 | 11/2010 | Langan et al. |
| 7,889,834 B2 | 2/2011 | Heismann |
| 8,055,039 B2 | 11/2011 | Wu et al. |
| 8,086,012 B2 | 12/2011 | Toth et al. |
| 8,111,803 B2 | 2/2012 | Edic et al. |
| 8,155,422 B2 | 4/2012 | Ziegler et al. |
| 8,160,206 B2 | 4/2012 | Wu et al. |
| 8,165,264 B2 | 4/2012 | Zou |
| 8,199,874 B2 | 6/2012 | Toth et al. |
| 8,199,875 B2 | 6/2012 | Chandra et al. |
| 8,218,837 B2 | 7/2012 | Wu |
| 8,229,060 B2 | 7/2012 | Proksa |
| 8,260,023 B2 | 9/2012 | Thomsen et al. |
| 8,294,717 B2 | 10/2012 | Zamyatin et al. |
| 8,311,181 B2 | 11/2012 | Thomsen et al. |
| 8,311,182 B2 | 11/2012 | Chandra et al. |
| 8,315,352 B2 | 11/2012 | Wu et al. |
| 8,494,244 B2 | 7/2013 | Dutta et al. |
| 8,588,494 B2 | 11/2013 | De Man et al. |
| 8,705,822 B2 | 4/2014 | Yu et al. |
| 8,787,519 B2 | 7/2014 | Fan et al. |
| 8,855,385 B2 | 10/2014 | Kriston et al. |
| 9,036,879 B2 | 5/2015 | Mendonça et al. |
| 9,036,886 B2 | 5/2015 | Hsieh et al. |
| 9,074,986 B2 | 7/2015 | Pal et al. |
| 9,135,728 B2 | 9/2015 | Fan et al. |
| 9,208,585 B2 | 12/2015 | Leng et al. |
| 9,208,918 B2 | 12/2015 | Tybinkowski et al. |
| 9,211,066 B2 | 12/2015 | Johnson et al. |
| 9,269,168 B2 | 2/2016 | Inglese et al. |
| 9,271,688 B2 | 3/2016 | Das et al. |
| 9,498,179 B1 | 11/2016 | Sen Sharma et al. |
| 9,532,759 B2 | 1/2017 | Taguchi et al. |
| 9,585,626 B2 | 3/2017 | Gao et al. |
| 9,610,055 B2 | 4/2017 | Taguchi et al. |
| 9,713,452 B2 | 7/2017 | Narayanan et al. |
| 9,747,704 B2 | 8/2017 | Taguchi et al. |
| 9,861,324 B2 | 1/2018 | Wang et al. |
| 9,913,622 B2 | 3/2018 | Ida et al. |
| 9,984,476 B2 | 5/2018 | Hsieh et al. |
| 2006/0203956 A1 | 9/2006 | Raupach |
| 2007/0078336 A1 | 4/2007 | Toth |
| 2009/0052621 A1 | 2/2009 | Walter et al. |
| 2012/0039440 A1 | 2/2012 | Fan et al. |
| 2014/0187932 A1 | 7/2014 | Li et al. |
| 2014/0270440 A1 | 9/2014 | Inglese et al. |
| 2014/0321603 A1 | 10/2014 | Taguchi et al. |
| 2017/0023498 A1 | 1/2017 | Worstell et al. |

OTHER PUBLICATIONS

Jeong, K.Y. et al., "Reduction of artifacts due to multiple metallic objects in computed tomography", Proc. SPIE, vol. 7258, 2009.

Kalender, W. et al., "Reduction of CT Artifacts Caused by Metallic Implants", Radiology, vol. 164, No. 2, 1987, p. 576.

Mouton, A. et al., "An Experimental Survey of Metal Artifact Reduction in Computed Tomography", J. Xray Sci. Technol., vol. 21, 2013, pp. 193-226.

Mouton, A. et al., "A Novel Intensity Limiting Approach to Metal Artifact Reduction in 3D CT Baggage Imagery", Proc. International Conference on Image Processing, IEEE, 2012, pp. 2057-2060.

Johnson et al., "Material differentiation by dual energy CT: initial experience", Eur. Radiol., vol. 17, No. 6, 2007, pp. 1510-1517.

Lehmann et al., "Generalized image combinations in dual KVP digital radiography", Med. Phys., vol. 8, No. 5, 1981, pp. 659-667.

Maaβ et al., "Image-based dual energy CT using optimized precorrection functions: A practical new approach of material decomposition in image domain", Med. Phys., vol. 36, No. 8, Aug. 2009, pp. 3818-3829.

Riedel, Michael, "An Introduction to Dual Energy Computed Tomography", University of Texas Health Science Center at San Antonio, 2010.

Szczykutowicz et al., "A simple image based method for obtaining electron density and atomic number in dual energy CT", Proc. SPIE, vol. 7961, 2011.

Wang et al., "A Review of Dual Energy CT: Principles, Applications, and Future Outlook", CT Theories and Applications, vol. 21, No. 3, Sep. 2012, pp. 367-386.

Beaulieu N.C., Introduction to "Linear Diversity Combining Techniques", Proceedings of the IEEE, Feb. 2003, vol. 91, No. 2, pp. 328-330.

Brennan, Linear Diversity Combining Techniques, Proceedings of the IEEE, Feb. 2003, vol. 91, No. 2, pp. 331-356.

Genant et al., Quantitative Bone Mineral Analysis Using Dual Energy Computed Tomography, Investigative Radiology, Nov.-Dec. 1977, vol. 12, No. 6, pp. 545-551.

Goodsitt et al., Quantitative Computed Tomography Scanning for Measurement of Bone and Bone Marrow Fat Content, Investigative Radiology, Oct. 1987, vol. 22, No. 10, pp. 799-810.

Goodsitt M.M. et al.. Accuracies of the synthesized monochromatic CT numbers and effective atomic numbers obtained with a rapid kVp switching dual energy CT scanner. Med. Phys., Apr. 2011, vol. 38, No. 4, pp. 2222-2232.

Jennings et al., Optimal x-ray spectra for screen-film mammography, Med. Phys., Sep./Oct. 1981, vol. 8, No. 5, pp. 629-639.

Kuchenbecker S. et al., Dual energy CT: How well can pseudo-monochromatic imaging reduce metal artifacts?, Med. Phys., Feb. 2015, vol. 42, No. 2, pp. 1023-1036.

Maaβ et al., Exact dual energy material decomposition from inconsistent rays (MDIR), Med. Phys., Feb. 2011, vol. 38, No. 2, pp. 691-700.

Mouton et al., A Novel Intensity Limiting Approach to Metal Artefact Reduction in 3D CT Baggage Imagery, Proc. International Conference on Image Processing, IEEE, 2012, pp. 2057-2060.

Rietzel et al., Deformable registration of 4D computed tomography data, Med. Phys., Nov. 2006, vol. 33, No. 11, pp. 4423-4430.

Seco J. et al., Assessing the effect of electron density in photon dose calculations, Med. Phys., Feb. 2006, vol. 33, No. 2, pp. 540-552.

Song L. et al., High-speed dynamic 3D photoacoustic imaging of sentinel lymph node in a murine model using an ultrasound array, Med. Phys., Aug. 2009, vol. 36, No. 8, pp. 3724-3729.

Vetter et al., Correction for scattered radiation and other background signals in dual-energy computed tomography material thickness measurements, Med. Phys., Sep./Oct. 1988, pp. 726-731.

Worstell W. et al., Diversity Combining Signal Processing and NEC in List-Mode PET, IEEE, 2004, vol. 6, pp. 3814-3818.

Xia T. et al., Noise and Bias Properties of Monoenergetic Images from DECT used for Attenuation Correction with PET/CT and Spect/CT, Proc. SPIE, May 2010, pp. 762225-762228.

Ying Z. et al., Dual energy computed tomography for explosive detection, Journal of X-Ray Science and Technology, 2006, vol. 14, pp. 235-256.

(56) References Cited

OTHER PUBLICATIONS

Yu L. et al., Dual-Energy CT-Based Monochromatic Imaging, AJR, Nov. 2012, vol. 199, pp. S9-S15.

1) FIG. 7B 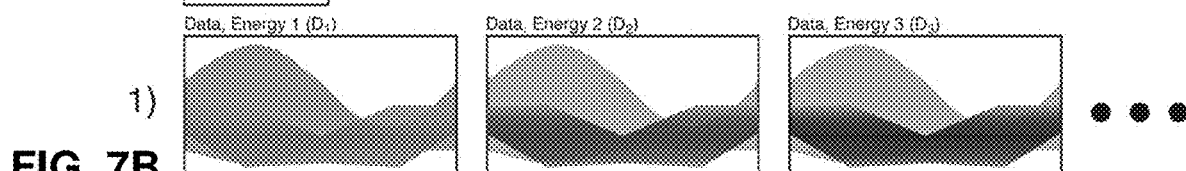
2) FIG. 7C 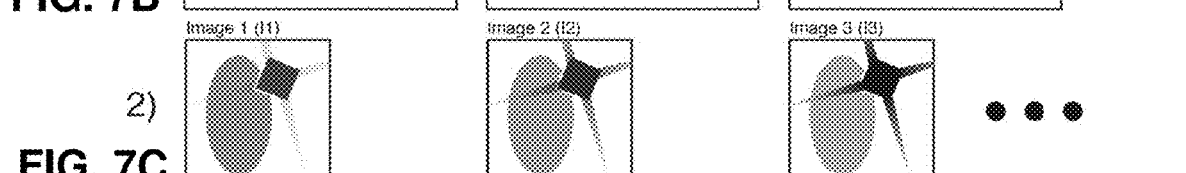
3) FIG. 7D  Artifact Source Image
$(ASI) = f(I_1, I_2, I_3 ... I_n)$
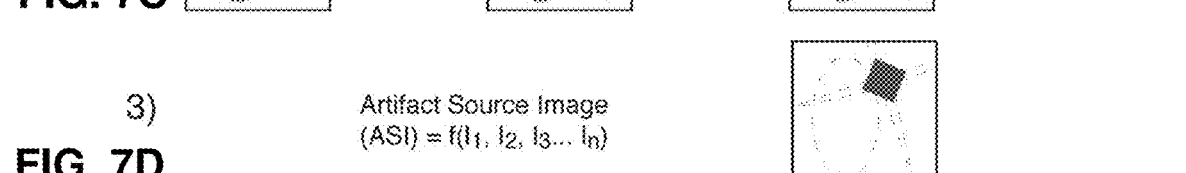
4) FIG. 7E  Artifact Source Data
$(ASD) = fp(ASI)$
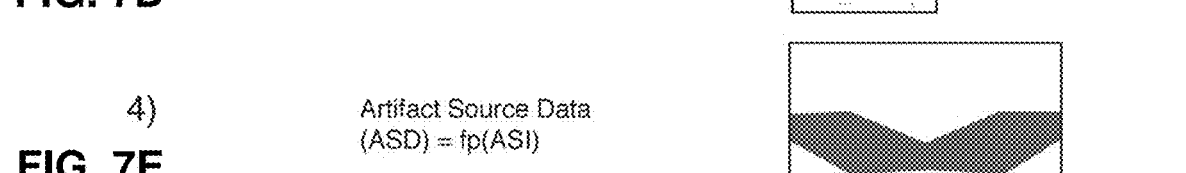
5) FIG. 7F  Artifact Reduced Data
$(ARD) = f(ASD, D_1, D_2, D_3 ... D_n)$
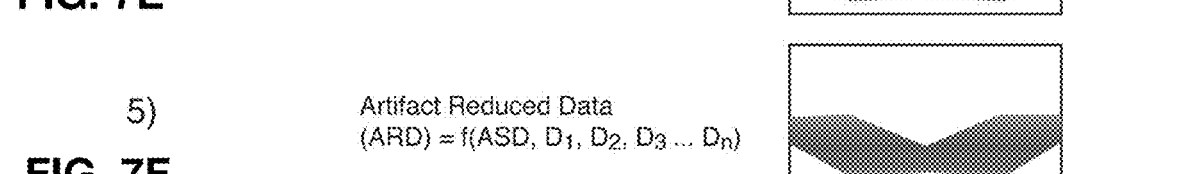
6) FIG. 7G  Repaired Data
$(RpD) = f(ARD, D_1, D_2, D_3 ... D_n)$
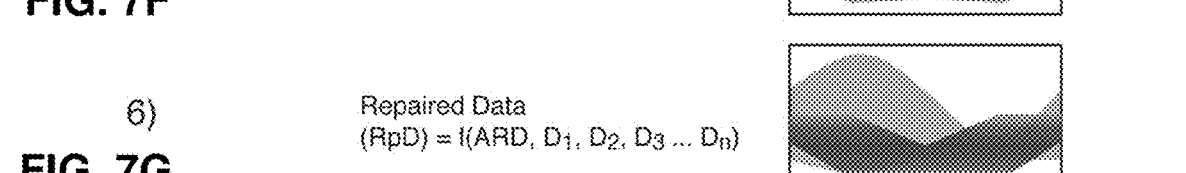
7) FIG. 7H  Reduced Artifact Image
$(RAI) = bp(RpD)$
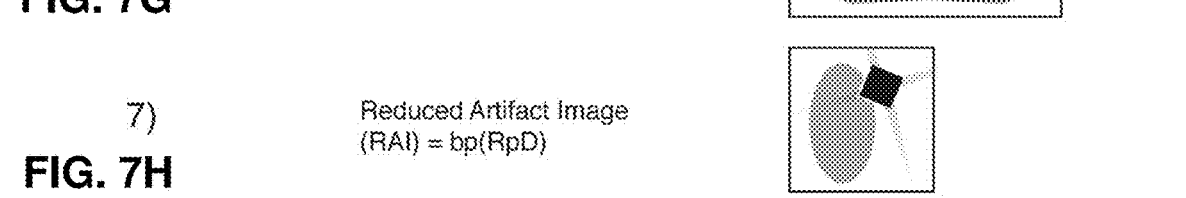

METHOD FOR ARTIFACT REDUCTION USING MONOENERGETIC DATA IN COMPUTED TOMOGRAPHY

FIELD OF THE INVENTION

This invention relates to imaging systems in general, and more particularly to computed tomography (CT) imaging systems.

BACKGROUND OF THE INVENTION

Computed tomography uses X-ray projections from multiple vantage points to construct a three dimensional (3D) data set. This process results in the generation of a "CT" image. Each point in the 3D data set describes the X-ray attenuating properties of a corresponding point in an object in space. CT scanners are used in medicine, material diagnostics, and airport security.

Metals are highly attenuating to X-rays and, because of this, they produce artifacts in reconstructed images. As a result, efforts have been made to eliminate these artifacts, however, all of the approaches developed to date suffer from various disadvantages, e.g., computational overhead, image accuracy, etc.

A. Context

Computed tomography devices have a source of X-rays which are sent through an object of interest to a set of detectors. Each detector measures the amount of X-ray attenuation which occurs along the path connecting the source to that detector. This attenuation data is sometimes known as projection data, inasmuch as the detected X-ray intensities are representative of the object's shadow projected on to the surfaces of the detectors. Many sets of projection data, taken from different angles of view, can be used to mathematically reconstruct the full 3D shape and attenuating properties of the object. The mathematical transformation known as "backprojection" solves the essentially geometrical problem of determining the shape and composition of the object that would produce the observed X-ray projection data.

FIG. 1 illustrates some common components and concepts in CT scanning. Typically an X-ray source 1 emits X-rays 2, some of which pass through an object 4, and are detected by an array of X-ray detectors 5. The X-ray source 1 and detectors 5 are typically mounted on a rotating gantry 6A which rotates in a direction 6 about a center point 3, which allows for the measurement of X-ray attenuation through the object from multiple orientations, whereby to generate the projection data which is used to reconstruct the full 3D shape and attenuating properties of object 4.

X-rays are reduced in intensity exponentially with passing distance through an object, and accounting for this allows one to interpret X-ray signals from a geometric perspective. Equation 1 below is the equation describing the exponential decay of X-rays as they pass through some material, where I is the X-ray intensity after having passed through some material, $I_0$ is the unimpeded X-ray intensity, x is the amount of material that the X-rays have passed through, and mu is a constant for a given material and X-ray energy:

$$I(x) = I_0 e^{(-x \, mu)} \quad \text{Eqn 1}$$

In the instance where the X-rays used to probe the object of interest are of a single energy (color), Equation 1 is easily inverted:

$$X = -\ln(I/I_0)/mu \quad \text{Eqn 2}$$

Equation 2 implies that, assuming that mu is a constant, one can determine the geometric length of the material that the X-rays have passed through by knowing I and $I_0$. Unfortunately, both the material characteristics (mu) and the length of the path through the object may vary with orientation. The approximate solution to this problem is known as backprojection. X-ray detector data can be backprojected to produce an approximate image of the object, where each point in the image is a measure of the X-ray attenuation of a corresponding point in the object.

B. Exemplary Mechanisms which Create Metal Artifacts

For context, two mechanisms will now be described which lead to the creation of artifacts within reconstructed images. These two mechanisms are saturation and beam hardening.

1. Saturated Attenuation

The following simplified example, using a CT imaging system with a single detector, illustrates how the mechanism of signal saturation can impact images (actual CT systems use arrays of multiple detectors to faithfully reconstruct objects of complex shapes located anywhere within the designed field of view, however, the following example using a single detector can adequately demonstrate the saturation concept).

FIG. 2 shows the location of an X-ray source 9 and a single detector 7 as the source and detector are rotated about the object of interest through a series of angular positions 1-9 (source positions are denoted with an "s" and detector positions are denoted with a "d"). Further incremental source positions s10-s18 and detector positions d10-d18 (not shown) would mirror the data acquired over source positions s1-s9 and detector positions d1-d9.

The amount of signal detected at each rotational position is related to the length of material which the X-ray passes through, as described by Equation 1 above. In FIG. 3, the blue dots show the X-ray signal as a function of angular position. Notice that in FIG. 2, the X-ray path associated with source position 2 (s2) or 3 (s3) passes through a small amount of material, whereas the X-ray path of source position 7 (s7) passes through the longest extent of the object. This effect is mirrored in FIG. 3, where the minimum X-ray attenuation is seen at source position 3 (s3), and the maximum X-ray attenuation is seen at source position 7 (s7).

Metals are highly attenuating to X-rays. While an X-ray detector is, ideally, capable of detecting smaller and smaller quantities of X-rays, detector "noise" and photon quantization place practical physical limits on detector sensitivity. To illustrate the consequences of this, consider the previous example, but place a limit on the lowest possible detectable signal. In FIG. 3, the "x's" represent a truncated version of the data, which mimics the impact of limited detection at low X-ray fluxes. Note how the saturated signal in FIG. 3 produces significantly lower measured X-ray attenuation at angular positions 6-8 (and at angular positions 15-17) than the ideal signal would produce. Real-world systems generally have a continuous roll-off of detectability at low X-ray fluxes, but for illustrative purposes, it can be modelled as an abrupt truncation such as is shown in FIG. 3. FIG. 4 is a "prediction" of the shape of an object which is consistent with the model-truncated data of FIG. 3 (i.e., if the model-truncated data of FIG. 3 were to be backprojected to form an image, the object shown in FIG. 4 would be the result).

In practice, high attenuation levels (e.g., such as those produced when scanning objects which comprise metals), correlated with small signal levels, result in detector data which are effectively truncated to some smallest value. Geometrically, in the simplified example discussed above, this translates to a long, fixed path length for the X-ray paths which are highly attenuated (e.g., by metal which is present in the scan field). In a complete system with many detectors, this manifests itself with streaks which align themselves with the longest X-ray paths through dense objects.

2. Beam Hardening

Within the CT industry, X-ray sources are typically "spectrally broad". X-ray photons of all energies are emitted simultaneously and the average degree of X-ray attenuation (mu) varies with the amount of material the X-rays have passed through. However, within the broad X-ray spectrum of the source, X-rays of lower energy are attenuated more quickly (higher mu) than X-rays of higher energy (lower mu). This problem of higher attenuation of lower energy X-rays is known as "beam hardening".

Moderate beam hardening can manifest itself as a slight reduction in the reconstructed CT values at the center of an object (a "dishing" effect). More extreme beam hardening effects can cause image artifacts more like the saturation artifacts described above. By way of example, FIG. 5 shows the effects of more extreme beam hardening. Objects comprising metals generally produce more extreme beam hardening effects due to their high attenuation of lower energy X-rays.

A number of ways have been developed for addressing beam hardening.

The most direct method is to use a monoenergetic X-ray source which produces a single X-ray energy. Data obtained with monoenergetic sources are largely immune to the effects of beam hardening. However, this approach is expensive and hence impractical for most applications.

Another method is to assume that the mu values of the materials are very close to that of water and to develop an equation (similar to Equation 1) which describes the relationship between distance and X-ray intensity for a polyenergetic X-ray source. This approach works fairly well in medical CT where most biological tissue has X-ray attenuation similar to that of water. However, this approach does not work well where the object comprises metal. More particularly, a simple beam hardening correction which assumes that all mu values are close to that of water will not accurately correct for beam hardening where there is metal present in the scan field and will lead to streaks within the image.

Other approaches for correcting for beam hardening may perform better in the presence of metal, but these often involve multiple reconstructions (backprojections) and/or data modelling (forward projections), and can be computationally expensive.

Recently, another method has been developed which involves the use of two different polyenergetic X-ray sources. The two sources have different polyenergetic spectra, one generally being higher energy than the other. These two polyenergetic spectra can be processed together so as to produce synthetic monoenergetic data and, ultimately, synthetic monoenergetic images (see U.S. Patent Application Publication No. US 2017/0023498 A1 filed by Photo Diagnostic Systems, Inc. and William A. Worstell et al. for METHOD AND APPARATUS FOR PERFORMING MULTI-ENERGY (INCLUDING DUAL ENERGY) COMPUTED TOMOGRAPHY (CT) IMAGING, which patent application is hereby incorporated herein by reference, which provides a description of how two different polyenergetic X-ray sources may be used to produce synthetic monoenergetic images). While such synthetic monoenergetic images are more resistant to the effects of beam hardening, the synthetic monoenergetic data derived from multiple broad-spectrum measurements are approximate and must assume a range of typical material attenuation responses. Hence, synthetic monoenergetic images generated using two different polyenergetic X-ray sources still do not perfectly correct for the beam hardening effects of metals.

C. Metal Artifact Correction

Described below are some common approaches for correcting scan data which has been negatively impacted by the presence of metal in the scan field.

A first class of metal artifact correction involves the identification and replacement of metal-contaminated data in the raw data space (i.e., in the fanogram, sinogram or projection space). The simplest approaches involve replacing data regions that have been contaminated by metal with an interpolation of the data from neighboring uncontaminated detector channels (see Willi Kalender, Robert Hebel, Johannes Ebersberger, "Reduction of CT Artifacts Caused by Metallic Implants", Radiology, vol 164, no. 2, pp 576 (1987) and Gary Glover, Norbert Pelc, "An algorithm for the reduction of metal clip artifacts in CT reconstructions", Med. Phys., vol 8, no. 6, pp 799-807 (1981)). Because of the simplicity of this approach, this "sinogram completion" method has been highly studied and evaluated. These interpolation methods have been identified as effective for a narrow range of cases where the metal in question is embedded within a homogeneous setting. For example, metal staples within the abdomen. These interpolation methods fail when the adjacent detector channels, used for the interpolation, have data values which are different from the adjacent tissue, e.g., where a staple is near bone and soft tissue. In addition, these schemes generally rely on simple linear or polynomial interpolations which are not guaranteed to generate values which are consistent with a physical object. In general, this class of metal artifact corrections reduces some artifacts, but often generates new artifacts.

A second class of metal artifact corrections involves the use of "priors" for replacing sinogram values. More particularly, with this approach, regions of the image containing metal are identified, replaced with a moderated value, and then forward projected back to the detector space. These new detector values are then used to replace the metal-contaminated detector values. This ensures that the replacement data is self-consistent with a real object in image space, and eliminates some of the artifacts generated when using a simple interpolation scheme. For medical applications, metal artifacts within the image can safely be limited to values associated with either water or bone, and this a-priori knowledge is then utilized in the medical CT artifact corrections. The use of priors in security applications poses a greater challenge because of the wider range of materials encountered. Further refinements of this method include additional filtering and interpolation steps (Gary Glover, Norbert Pelc, "An algorithm for the reduction of metal clip artifacts in CT reconstructions", Med. Phys., vol 8, no. 6, pp 799-807 (1981) and K. Y. Jeong and J. B. Ra, "Reduction of artifacts due to multiple metallic objects in computed tomography", Proc. SPIE, vol 7258, p. 72583E (2009)). This class of metal artifact corrections is still limited in its efficacy and can be computationally expensive since this class of metal artifact corrections involves a forward projection of a complete image.

A third class of metal artifact corrections is to rely on an iterative reconstruction process where many cycles of forward and back projections are used to derive the most likely image which is consistent with the measured data. This approach is one of the most effective means for reducing metal artifacts, but is often complex and computationally expensive.

SUMMARY OF THE INVENTION

An object imaged with a low-energy monochromatic X-ray source demonstrates a high degree of contrast between radiologically opaque and transparent objects, while an object imaged with a high-energy monochromatic X-ray source shows relatively low contrast between materials. Likewise, high-energy X-rays are less likely to be impeded by metal and the images generated from high-energy X-ray data suffer less from metal artifacts.

The present invention combines high-energy data and low-energy data in such a way so as to maximize the benefits of both. In regions of data where metal has not impacted measurements, low-energy data is preferred because of its high contrast characteristics, whereas in regions impacted by metal, high-energy data is preferred because of its inherent resistance to artifacts.

The monoenergetic data may be obtained by direct or indirect means.

This method represents a simple, and computationally inexpensive means for reducing metal artifacts.

In an alternative form of the present invention, data sets with different energies (monoenergetic or polyenergetic) may be used.

In one preferred form of the present invention there is provided a method for artifact correction in computed tomography, the method comprising:

(1) acquiring a plurality of data sets associated with different X-ray energies (i.e., $D_1, D_2, D_3 \ldots D_n$);

(2) generating a plurality of preliminary images from the different energy data sets acquired in Step (1) (i.e., $I_1, I_2, I_3 \ldots I_n$);

(3) using a mathematical function to operate on the preliminary images generated in Step (2) to identify the sources of the image artifact (i.e., the artifact source image, or ASI, where ASI=$f(I_1, I_2, I_3 \ldots I_n)$);

(4) forward projecting the ASI to produce ASD=fp(ASI);

(5) selecting and combining the original data sets $D_1, D_2, D_3 \ldots D_n$ in order to produce a new subset of the data associated with the artifact, whereby to produce the artifact reduced data, or ARD, where ARD=$f$ (ASD, $D_1, D_2, D_3 \ldots D_n$);

(6) generating a repaired data set (RpD) to keep low-energy data in artifact-free data and introduce high-energy data in regions impacted by the artifact, where RpD=$f$(ARD, $D_1, D_2, D_3 \ldots D_n$); and (7) generating a final reduced artifact image (RAI) from the repaired data, RAI=bp(RpD), where the function bp is any function which generates an image from data.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 7A-7H are schematic views showing a generalized process for reducing artifacts.

DETAILED DESCRIPTION OF THE PREFERRED EMBODIMENTS

Metal Artifact Correction Using Monoenergetic Data

Figure 1:
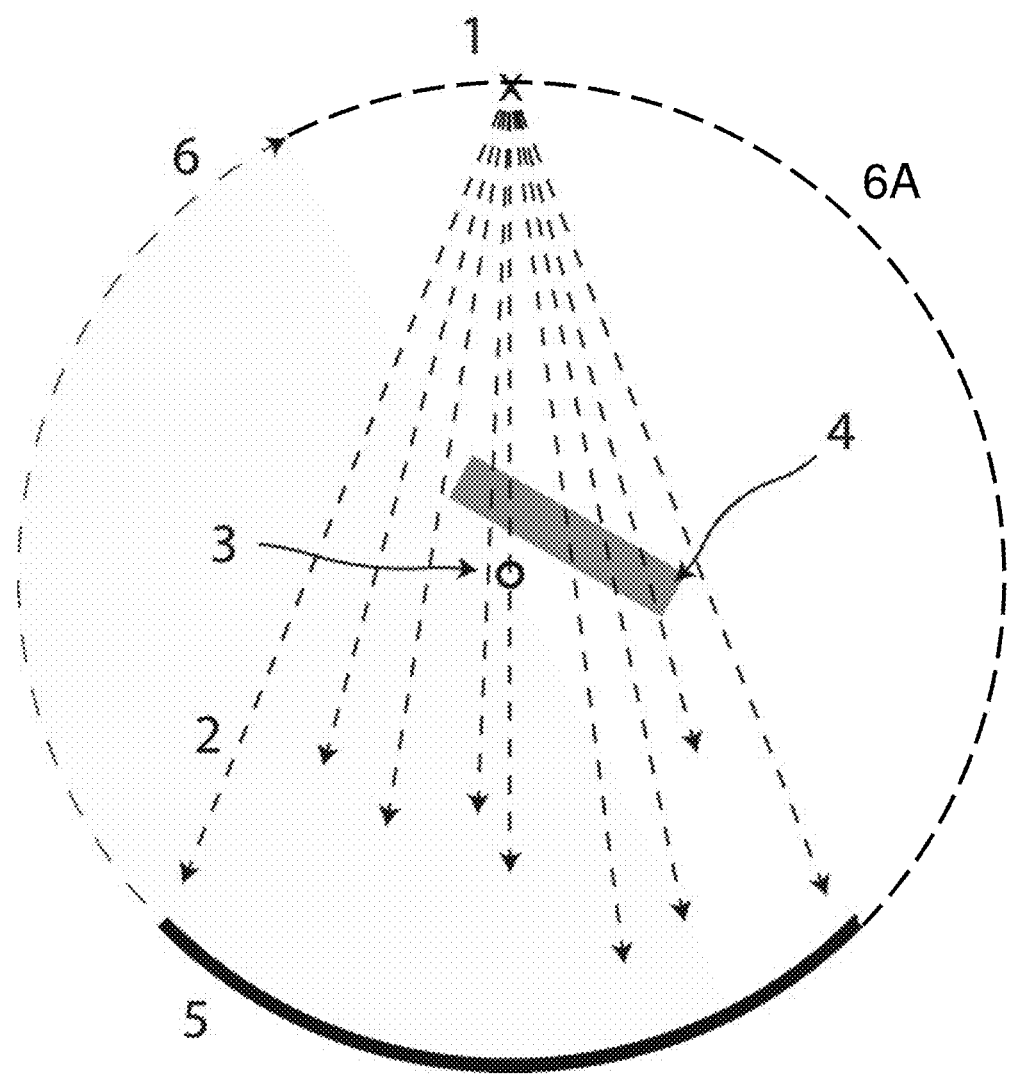
FIG. 1 is a schematic view showing typical elements of a CT, including an X-ray source, X-ray(s), a rotational center, an object of interest to be scanned, an array of x-ray detectors, a direction of rotation and a rotating gantry.
Figure 2:
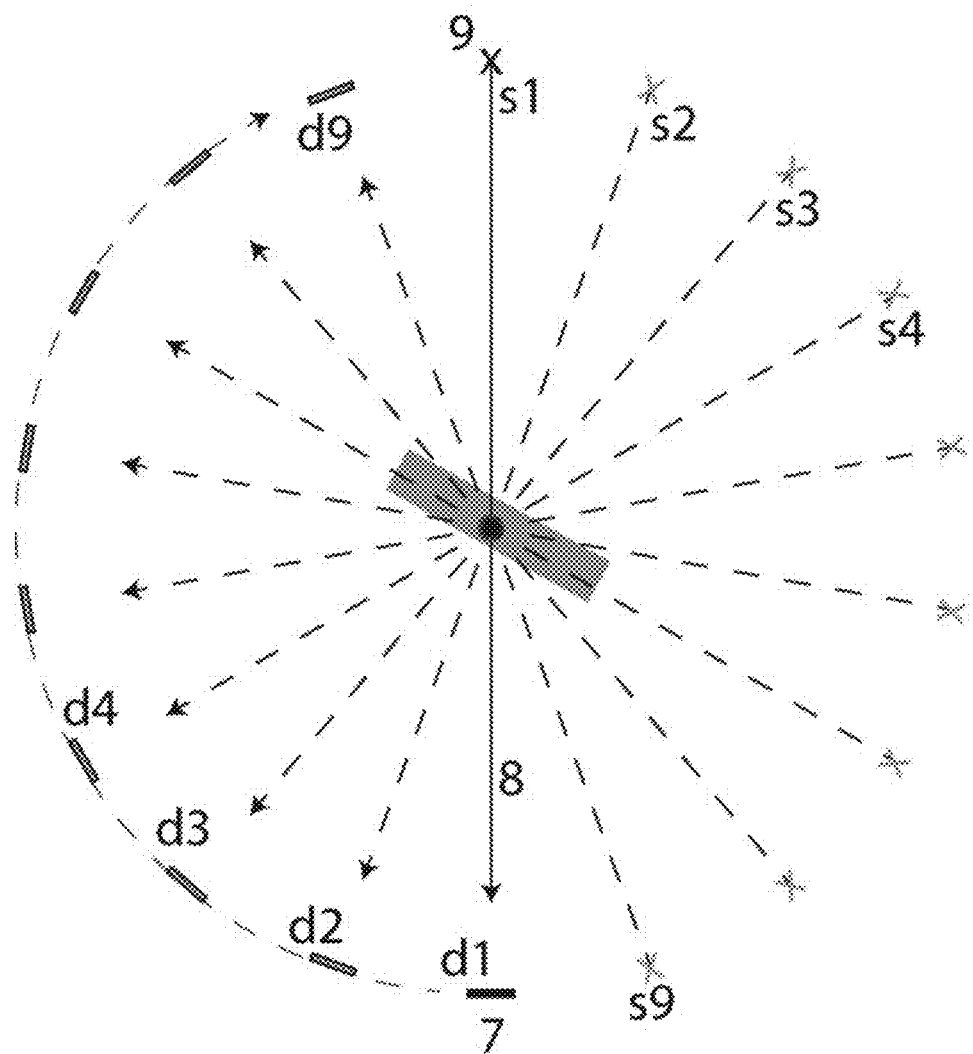
FIG. 2 is a schematic view showing the locations of an X-ray source and a single detector as the source, with the detector being rotated about the object of interest through a series of angular positions 1-9 (source locations are denoted with an "s", detector with a "d")
Figure 3:
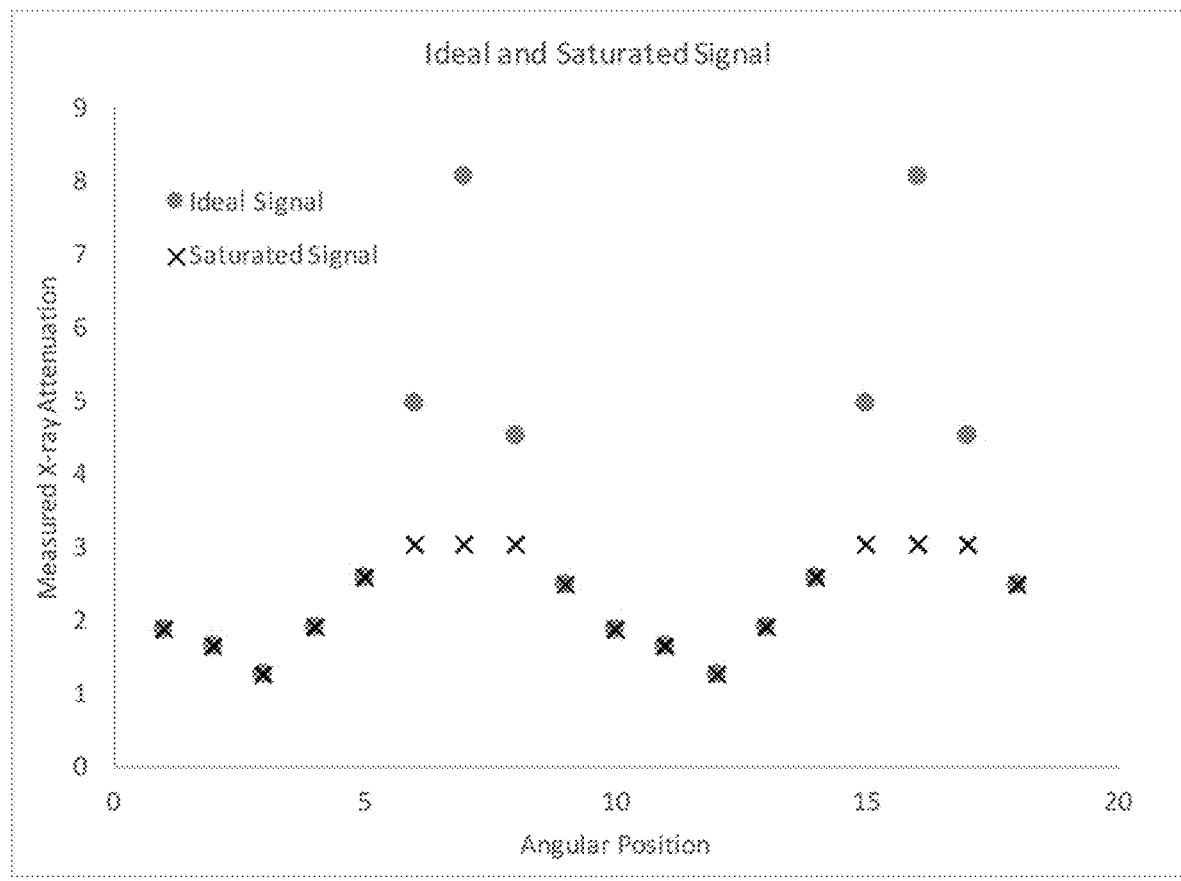
FIG. 3 is a graph showing a plot of x-ray attenuation verses angular position for the object and ray geometry shown in FIG. 2, wherein circles represent values for an ideal system, and x's represent a system where saturation effects are present.
Figure 4:
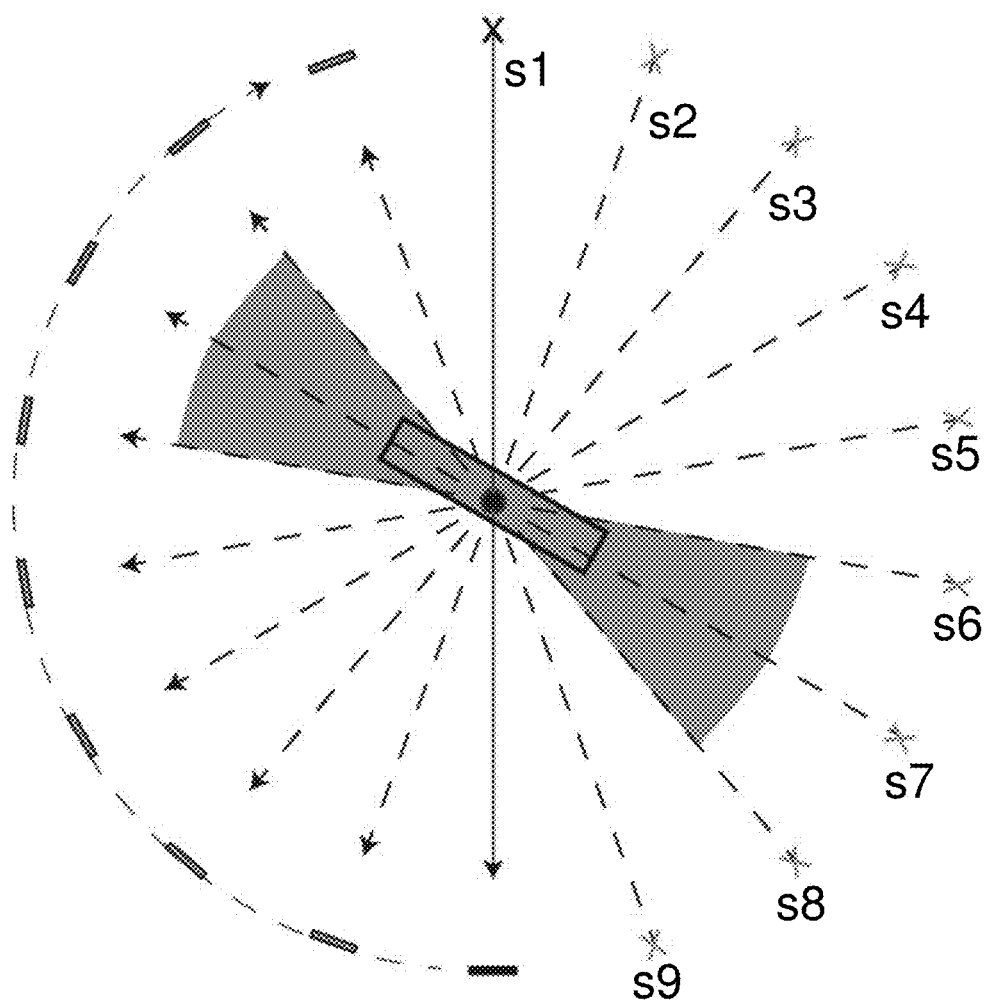
FIG. 4 is a schematic view showing an object shape which is consistent with the saturated data model of FIG. 3.
Figure 5:
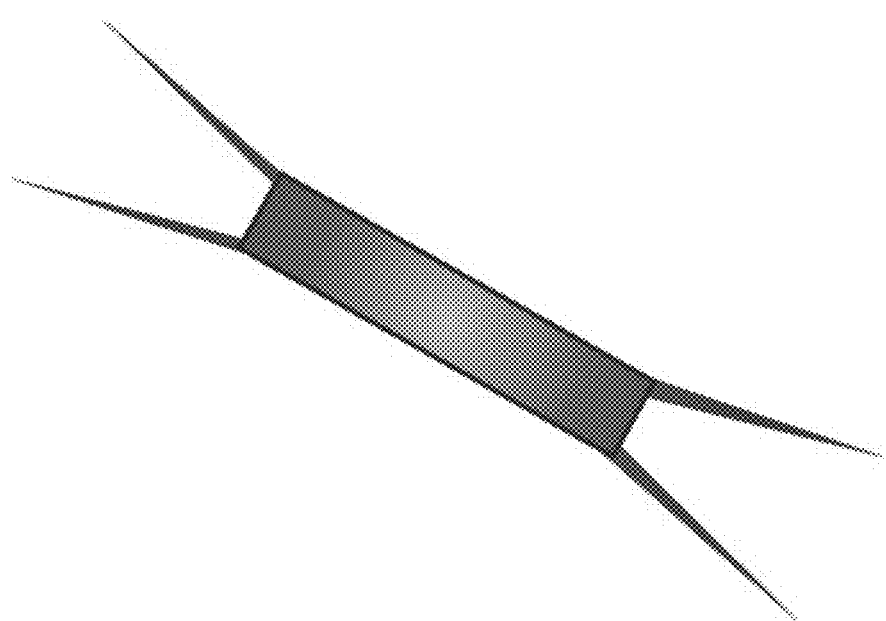
FIG. 5 is a schematic view showing the object of FIG. 2 with extreme beam hardening artifacts.

In the preferred embodiment of the present invention, several monoenergetic data sets (either approximation-derived, experimentally-measured or synthetically-derived) are used together to minimize artifacts and maximize image quality. More particularly, an object imaged with a low-energy monochromatic X-ray source demonstrates a high degree of contrast between radiologically opaque and transparent objects, while an object imaged with a high-energy monochromatic X-ray source shows relatively low contrast between materials. This is anecdotally explained by the fact that high-energy X-rays tend to simply pass through all materials, whereas low-energy X-rays are more likely to interact with the material via absorption or scattering. Likewise, high-energy X-rays are less likely to be impeded by metal and the images generated from high-energy X-ray data suffer less from metal artifacts.

The fundamental idea is to combine the high-energy data and the low-energy data in such a way so as to maximize the benefits of both. In regions of data where metal has not impacted measurements, low-energy data is preferred because of its high contrast characteristics, whereas in regions impacted by metal, high-energy data is preferred because of its inherent resistance to artifacts.

In a CT system which is capable of generating monoenergetic images, low-energy images are generally more desirable because of their high contrast. However, these low-energy monoenergetic images are also more susceptible to metal artifacts. Therefore, the present invention is used to generate a composite image which utilizes low-energy monoenergetic data for low attenuation regions of the object being scanned and high-energy monoenergetic data for high attenuation regions of the object being scanned.

More particularly, with the present invention, "metal" is first identified in a preliminary image. This image may be generated using any kind of X-ray source, e.g., polyenergetic, monoenergetic, high- or low-energy, etc. Note that for purposes of the present invention, the term "metal" is used to describe any material which generates artifacts and may include particularly dense materials, or materials with unusual attenuation properties. In one simple embodiment, the metal in the preliminary CT image is identified by subjecting the image to a threshold attenuation value, where pixels having an attenuation value higher than this threshold are considered to be metal. All other pixels containing values associated with a non-metal material are set to zero.

The pixels within the image identified to contain metal are then forward projected so as to identify which of the "raw" detector readings have been affected by metal. In the preferred embodiment, only those pixels which are identified as containing metal are forward projected. Note that while there may be other advantages to forward projecting a complete image, forward projecting only those portions of the image impacted by metal leads to a computationally efficient process. The forward projection of the metal-containing portions of the image produces a simulated data set where the value at each data location is related to the amount of metal observed along a line connecting the X-ray source to the sensor, and the forward projection is a measure of the degree of impact the metal has on the data along that line. For purposes of the present invention, the forward projection of the identified metal may be referred to as the map of the metal-impacted data.

In one embodiment, the data value associated with each detector is corrected according to the amount of metal intersecting the line of response connecting the X-ray source to the X-ray detector. In the preferred embodiment, the magnitude of the correction is abandoned for a binary decision where each data point is analyzed to determine whether there has been any metal interference in the path connecting the X-ray source to the X-ray detector. The practical implementation of this preferred embodiment is to qualify the simulated data set by a threshold attenuation value so as to produce a binary identifier describing which data points have been impacted by metal (which may be referred to as "metal-impacted data"). These data, negatively impacted by the presence of metal, need to be repaired in such a way so as to reduce metal artifacts while remaining geometrically consistent with the objects being reconstructed.

The quality of the data identified within the map of metal-impacted data are less negatively influenced in the high-energy X-ray data than in the low-energy X-ray data. In the preferred embodiment, the metal-impacted areas of the low-energy data set are repaired by "mixing-in" a fixed fraction of the high-energy data set. By restricting the data repair of the low-energy data set to areas known to be impacted by metal, the desirable high contrast traits of the low-energy image are retained where appropriate while gaining the high-energy ability to image through metal in the appropriate regions.

Figure 6A:
FIGS. 6A-6H are schematic views illustrating a process for metal identification and mixing of high-energy data into data regions which have been impacted by metal in the form of a flowchart which is to be read from top to bottom.
Figure 6B:
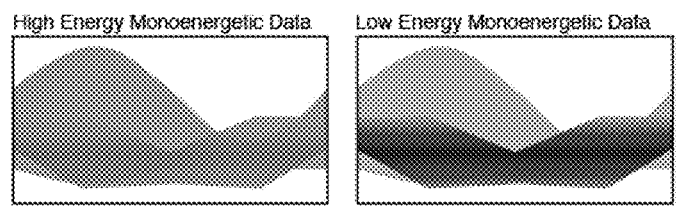
Figure 6C:
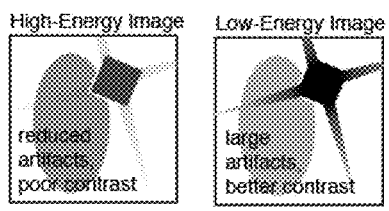
Figure 6D:
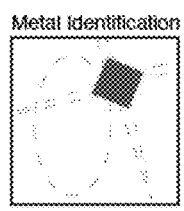
Figure 6E:
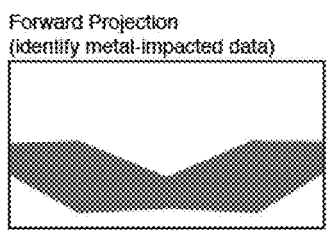
Figure 6F:
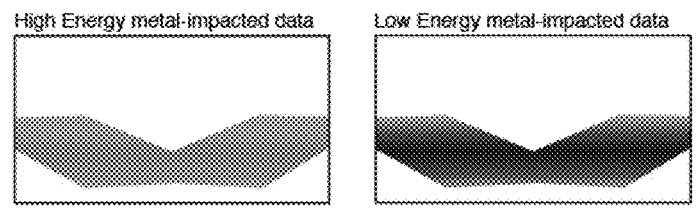
Figure 6G:
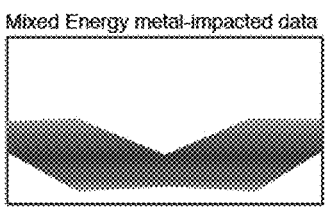
Figure 6H:
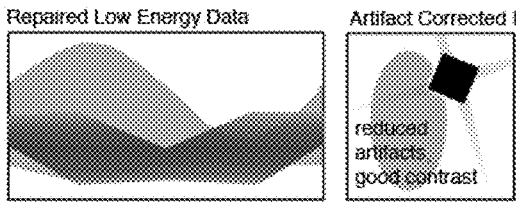
Figure 7A:
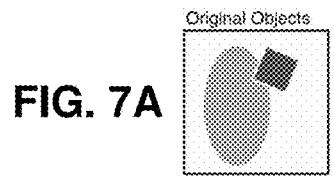

Thus, with the present invention, and referring now to FIGS. 6A-6H, metal artifact correction of an image of an object (FIG. 6A) may be affected by:

(1) scanning the object with a high-energy monoenergetic X-ray source and a low-energy monoenergetic X-ray source so as to create two monoenergetic data sets (FIG. 6B);

(2) generating a high-energy monoenergetic image and a low-energy monoenergetic image (FIG. 6C);

(3) using a pixel threshold to segregate the high-energy monoenergetic image and the low-energy monoenergetic image into metal and non-metal portions (FIG. 6D);

(4) forward projecting the regions of data associated with the metal so as to produce a map of metal-impacted data (FIG. 6E);

(5) using the map of metal-impacted data to select and combine elements of the high-energy monoenergetic image and the low-energy monoenergetic image to produce a new subset of image data for the regions associated with the artifact (FIG. 6F);

(6) integrating the "repaired data" identified in Step (5) above with the image data for the regions which are not metal-impacted so as to create a complete data set (FIG. 6G); and (7) using the complete data set to produce a new image which has reduced artifact impact (FIG. 6H).

Metal Artifact Correction Using Monoenergetic and/or Polyenergetic Data ("Generalized Correction")

In the foregoing discussion, metal artifact correction was effected using two sets of monoenergetic data (i.e., high-energy monoenergetic data and low-energy monoenergetic data). However, it is also possible to effect metal artifact correction using polyenergetic data of two different energy levels.

More particularly, in this form of the invention, a material with anomalous spectral properties (e.g., highly attenuating metals) is first identified. In the most generalized correction, the initial material identification can be performed by looking at how regions of the material behave across a set of monochromatic images or by identifying objects with a common set of X-ray absorption spectra. In the preferred embodiment discussed above, this method was simplified to any image regions with high attenuation. In the more generalized case, one could, for instance, preferentially identify biological tissues with spectral properties similar to lung tissue or very dense bone. This is achieved by applying a mathematical function to the set of available monochromatic images (or to several polychromatic sets) in order to select the areas within the image with the desired spectral properties.

Once the regions within the image are identified as containing metal, the "metal only" regions are forward projected onto the data space, thereby quantifying the degree of impact. In the most generalized case, the forward projection of a selected material is used to quantify the total contribution of that material to the measurement at a given detector. This parameter can be used to selectively combine the monoenergetic data sets (or polychromatic data sets) into a data set with optimal properties for the selected material. For example, the forward projection of lung tissue identifies which detectors are used in measuring lung tissue. For those lung tissue data channels, a function can be used to construct an optimal data set from the set of monochromatic data sets (or polychromatic data sets) for imaging lungs. Likewise, data associated with the imaging of bone or metal can be constructed to minimize artifacts. In all cases, data for every detector channel is optimized for the materials sampled by that detector.

Thus, with the present invention, and referring now to FIGS. 7A-7H, metal artifact correction of an image of an object (FIG. 7A) can be generalized to the following steps:

(1) Generating or acquiring any number of data sets associated with different energies ($D_1, D_2, D_3 \ldots D_n$). These data sets can be monoenergetic, or polyenergetic with different energy distributions (i.e., polychromatic high-, mid- and low-energy). See FIG. 7B.

(2) Generating any number of preliminary images from the different energy data sets described in Step (1) ($I_1, I_2, I_3 \ldots I_n$). See FIG. 7C.

(3) Using a mathematical function which operates on the preliminary images of Step (2) to identify the sources of the image artifact. This function may produce a binary image (locating regions of artifact-generating objects) or a measure of the degree of artifact impact, i.e., stronger values where the object has larger negative impact. This may be referred to as the artifact source image, or ASI, where $ASI=f(I_1, I_2, I_3 \ldots I_n)$. See FIG. 7D.

(4) Using a mathematical function which transposes an image into model data (i.e., a forward projector). The regions of data associated with the artifact sources are known as the artifact source data, or ASD. The artifact source data is the forward projection of the ASI, or $ASD=fp(ASI)$. See FIG. 7E.

(5) Using the artifact source data set to select and combine the original data sets $D_1, D_2, D_3 \ldots D_n$ in order to produce a new subset of the data associated with the artifact. This is known as the artifact reduced data, or ARD, where $ARD=f(ASD, D_1, D_2, D_3 \ldots D_n)$. See FIG. 7F.

(6) Constructing the repaired data (RpD) into a data set in such a way as to optimize positive image characteristics (i.e., to keep low-energy data in artifact-free data and introduce high-energy data in regions impacted by metal). This is generically described as a function $RpD=f(ARD, D_1, D_2, D_3 \ldots D_n)$. See FIG. 7G.

(7) Reconstructing the final reduced artifact image (RAI) from the repaired data, or $RAI=bp(RpD)$. Here the function bp is generically any function which generates an image from data. See FIG. 7H.

MODIFICATIONS

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method for artifact correction in computed tomography, the method comprising:
    (1) acquiring a plurality of data sets $(D_1, D_2, D_3 \ldots D_n)$ associated with at least one low X-ray energy, and at least one high X-ray energy;
    (2) generating a plurality of preliminary images $(I_1, I_2, I_3 \ldots I_n)$ from the plurality of data sets acquired in Step (1);
    (3) identifying sources of an artifact source image (ASI), wherein $ASI=f(I_1, I_2, I_3 \ldots I_n)$;
    (4) forward projecting the artifact source image (ASI) to produce artifact source data (ASD), wherein $ASD=fp(ASI)$;
    (5) selecting and combining the plurality of data sets $(D_1, D_2, D_3 \ldots D_n)$ acquired with at least one low X-ray energy and at least one high X-ray energy in order to produce a new subset of data associated with the artifact, whereby to produce artifact reduced data (ARD), wherein $ARD=f(ASD, D_1, D_2, D_3 \ldots D_n)$;
    (6) generating a repaired data set (RpD) to keep data sets associated with the low X-ray energy in artifact-free data and to introduce data sets associated with the high X-ray energy in regions impacted by an artifact, wherein $RpD=f(ARD, D_1, D_2, D_3 \ldots D_n)$; and
    (7) generating a final reduced artifact image (RAI) from the repaired data set, wherein $RAI=bp(RpD)$, and further wherein the function bp is any function which generates an image from data.

2. A method according to claim 1 wherein the plurality of data sets $(D_1, D_2, D_3 \ldots D_n)$ associated with at least one of the low X-ray energy and the high X-ray energy are monoenergetic.

3. A method according to claim 1 wherein the plurality of data sets $(D_1, D_2, D_3 \ldots D_n)$ associated with at least one of the low X-ray energy and the high X-ray energy are polyenergetic with different energy distributions.

4. A method according to claim 3 wherein the plurality of data sets $(D_1, D_2, D_3 \ldots D_n)$ associated with at least one of the low X-ray energy and the high X-ray energy are polyenergetic with polychromatic high-, mid- and low-energy energy distributions.

5. A method according to claim 1 wherein the step of identifying sources of an artifact source image (ASI) produces a binary image locating regions of artifact-generating objects.

6. A method according to claim 1 wherein the step of identifying sources of an artifact source image (ASI) produces a measure of the degree of artifact impact where stronger values occur where the object has larger negative impact.

* * * * *